Patented Aug. 19, 1947

2,425,765

UNITED STATES PATENT OFFICE 2,425,765

UNSATURATED ALKYL ESTERS OF ARYL PHOSPHONIC ACIDS

Arthur Dock Fon Toy, Chicago, Ill., assignor to Victor Chemical Works, a corporation of Illinois No Drawing. Application October 29, 1945, Serial No. 625,459

4 Claims. (Cl. 260—461)

This invention relates to a new class of unsaturated phosphonate ester compounds having the general formula

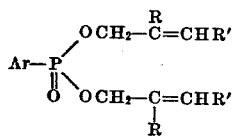

wherein Ar represents aryl and alkaryl hydrocarbon radicals and R and R' represent hydrogen and alkyl hydrocarbon radicals. The new ester compounds may be produced by reacting aryl phosphorus oxydichlorides with beta, gamma unsaturated alkyl alcohols under suitable reacting conditions.

The aryl phosphorus oxydichloride starting materials may be suitably prepared by the method of my U. S. patent application Serial No. 517,438, filed January 7, 1944, which comprises reacting an aryl phosphorus dichloride with phosphoric anhydride and chlorine, and separating the aryl phosphorus oxydichloride from the reaction products. The reaction involved may be expressed by the following equation:

$$3ArPCl_2 + 3Cl_2 + P_2O_5 \rightarrow 3ArPOCl_2 + 2POCl_3$$

The beta, gamma unsaturated alkyl alcohols suitable for use in making the products of the present invention may be designated by the general formula:

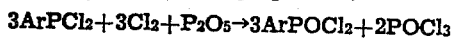

where R and R' represent hydrogen and alkyl hydrocarbon radicals. Typical alcohols of this type are allyl, methallyl and crotonyl alcohols.

The products of the present invention are clear liquid ester compounds which are suitable for use as plasticizers and modifying agents for a number of commercial type resins and plastics. They impart fireproofing characteristics to such resin products, and may be employed as organic solvents. They may under suitable conditions be polymerized to give satisfactory clear resin products.

The new beta, gamma unsaturated alkyl esters of aryl phosphonic acids may be prepared by reacting the sodium alcoholates of the unsaturated alcohols with aryl phosphorus oxydichloride but such procedure is difficult and the yields are poor. It has been found, however, that greatly improved yields and better products may be obtained by reacting the beta, gamma unsaturated alcohol with the aryl phosphorus oxydichloride in the presence of pyridine with or without an inert solvent such as benzene, hexane, etc.

The following examples illustrate my improved method of production.

Example 1

In a 2 liter 3-necked flask equipped with a stirrer, a thermometer, and a dropping funnel were placed 116 g. (2 moles) of allyl alcohol, 158 g. (2 moles) pyridine, and 440 grams of technical hexane. To this solution was added with stirring 195 g. (1 mole) of phenylphosphorus oxydichloride ($C_6H_5POCl_2$). The phenylphosphorus oxydichloride was slowly added over a period of about 2 hours while maintaining the reaction mixture at a temperature of from 2° to 7° C. The mixture was stirred for another hour and the white precipitate of pyridine hydrochloride formed in the reaction was filtered off and washed with 250 cc. of hexane. The filtrate consisting of an oily layer and a hexane layer was separated and the two layers processed separately. The hexane layer was distilled at a temperature of 31° to 35° C. under 150 mm. pressure to remove the hexane solvent. The residual liquid was gradually heated at 10 mm. until the liquid temperature reached 100° C. It was then heated to 120° C. at less than 5 mm. pressure, and finally distilled at less than 2 to 3 mm. pressure. A little copper powder was added prior to the distillation to act as an inhibitor against polymerization. The oily layer from the original filtration was diluted with 150 cc. of benzene and washed with 4 successive 25 cc. portions of water. The washed oil-benzene solution was then dried, the benzene distilled off, and the ester compound distilled and combined with the portion of the product obtained from the hexane layer. A total of 178 g. of the ester product representing a 75% yield was recovered.

Example 2

In an alternate procedure without the use of the hexane solvent medium, the diallyl phenylphosphonate ester was prepared as follows:

In a flask equipped as in Example 1 were placed 232 g. (4 moles) of allyl alcohol and 316 g. (4 moles) of pyridine. To this solution was slowly added with stirring 390 g. (2 moles) of phenylphosphorus oxydichloride over a period of about 4 hours. The temperature of the reaction mixture was maintained at about 2° to 5° C. by means of an ice-salt bath. The mixture was then stirred for another hour while allowing the temperature to rise gradually to room temperature. 200 cc. of water was added to dissolve and separate the pyridine hydrochloride formed in the reaction. After separating the oily layer it was washed twice with 50 cc. portions of a 3% NaOH solution in a 10% salt solution. The oil then was washed once more with 50 cc. of a 10% salt solution. The oil was dried and purified by distillation under the temperature and pressure conditions employed in Example 1.

An 83% yield of the diallyl phenylphosphonate ester was obtained in this example.

*Example 3*

The procedure of Example 2 was repeated using double the quantities of reactants and employing the following modification. After the reaction was completed and the oily layer separated, it was distilled under reduced pressure without first washing with alkali solution or water. In the distillation the heating was carried out slowly so as to maintain the pressure at less than 20 mm. up to 50° C. (liquid temperature), less than 10 mm. up to 100° C., less than 5 mm. up to 120° C., and less than 1-2 mm. up to the distillation temperature. The yield of the distilled product was 777 grams or 81.6% of theoretical.

The purified diallyl phenylphosphonate obtained in the above examples had the following physical properties:

| | |
|---|---|
| Form | Colorless liquid |
| Boiling point | 126–128° C. at 1 mm. |
| Specific gravity | 1.112 at 25° C. |
| Refractive index | 1.5106 at 28° C. |
| Acidity | <0.1 cc. N/10 NaOH/10 cc. (phenolphthalein indicator) |
| Surface tension | 39.3 dynes/cm. at 28° C. |
| Viscosity | 8.5 centipoises at 25° C., 3.6 centipoises at 70° C. |
| Freezing point | Very viscous at −70° C. |
| Solubility in water | 2.0 g./liter |
| Flash point (open cup) | 335° F. |
| Fire point (open cup) | 345° F. |
| Analysis | 13.5% P (found), 13.0% (theory) |

The reaction involved in the above examples may be designated by the following equation:

$$C_6H_5POCl_2 + 2HOCH_2-CH=CH_2 + 2C_5H_5N \longrightarrow$$

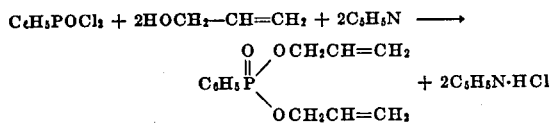

$$+ 2C_5H_5N \cdot HCl$$

Pyridine may be recovered from the pyridine hydrochloride residue by known means for reuse in the process.

*Example 4*

Diallyl phenylphosphonate was prepared in accordance with the procedure described in Example 2 except that 288 g. (4 moles) of methallyl alcohol was employed instead of the 232 grams (4 moles) of allyl alcohol. The purified dimethallyl phenylphosphonate produced in this example was a water-white liquid having a boiling range of 140–143° C. at 2–3 mm. pressure, and a refractive index of 1.5057 at 28° C. Analysis showed the product to correspond substantially to the formula:

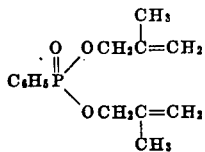

*Example 5*

Dimethallyl tolylphosphonate

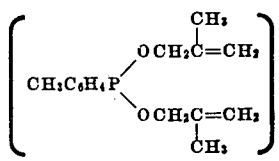

was prepared in accordance with the following procedure.

70 g. (0.335 mole) of tolylphosphorus oxydichloride

was added with stirring to a mixture of 48.5 g. (0.67 mole) of methallyl alcohol and 53 g. (0.67 mole) of pyridine. The temperature was maintained at 2 to 5° C. during the addition period by means of an ice-salt bath. The reaction mixture was allowed to rise to room temperature and 50 cc. of water added to dissolve out the pyridine hydrochloride. The oily ester layer was separated by means of a separatory funnel and dried by stirring with anhydrous magnesium sulfate. The magnesium sulfate was filtered off and the ester product purified by distillation under vacuum in the presence of a small amount of a polymerization inhibitor. The redistilled dimethallyl tolylphosphonate ester product had a boiling point of 137–139° C. at 3–4 mm. pressure and a refractive index of 1.5065 at 27° C. The yield of pure product in this example was 63 grams which represents a yield of 67.2% of theoretical.

*Example 6*

Following the procedure of Example 5, tolylphosphorus oxydichloride and allyl alcohol were reacted in the presence of pyridine to produce the diallyl tolylphosphonate ester. The redistilled ester was a water-white liquid having a boiling point of 127–128° C. at 3 mm. pressure and a refractive index of 1.5097 at 28° C. It had a phosphorus content of 12.4% compared to the theoretical value of 12.3% for the formula

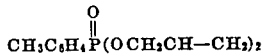

The beta, gamma unsaturated alkyl esters of aryl phosphonic acids of this invention tend to polymerize at temperatures near their boiling points so care must be taken in purifying them by distillation methods. This tendency to polymerize is satisfactorily inhibited by the addition of small amounts of copper, bronze, copper compounds, etc., during the distillation.

The proportions employed in the above examples are not critical with respect to the use of excess amounts of the alcohol and pyridine. Excesses of either the alcohol or pyridine may be separated and recovered after the ester forming reaction is completed.

The pyridine hydrochloride separated in the above examples may be reconverted by known means to pyridine for reuse in the process.

The ester forming reactions in the above examples were carried out at temperatures sufficiently low to avoid decomposition of the unsaturated alcohols by HCl liberated in the reaction prior to its absorption by the pyridine. Generally a temperature of the order of 10° C. will be satisfactory, though a temperature of less than 5° C. is preferred.

The foregoing detailed description has been given for clearness of understanding only, and no unnecessary limitations should be understood therefrom.

What I claim as new, and desire to secure by Letters Patent, is:

1. As a new compound diallyl phenylphosphonate.
2. As a new compound dimethallyl phenylphosphonate.
3. As a new compound diallyl tolylphosphonate.
4. A new product, a beta, gamma unsaturated alkyl diester of an aryl phosphonic acid.

ARTHUR DOCK FON TOY.

REFERENCES CITED

The following references are of record in the file of this patent:

UNITED STATES PATENTS

| Number | Name | Date |
|---|---|---|
| 2,226,552 | Conary | Dec. 31, 1940 |
| 1,785,951 | Ginson | Dec. 23, 1930 |
| 2,137,792 | Woodstock | Nov. 22, 1938 |
| 2,389,576 | Kosalopoff | Nov. 20, 1945 |
| 2,249,768 | Kropa | July 22, 1941 |

FOREIGN PATENTS

| Number | Country | Date |
|---|---|---|
| 517,538 | Germany | Feb. 13, 1931 |

OTHER REFERENCES

Beilstein, "Handbuch der Organische Chemie," 4th ed., vol. XVI, p. 804 (1933).